United States Patent Office 2,893,141
Patented July 7, 1959

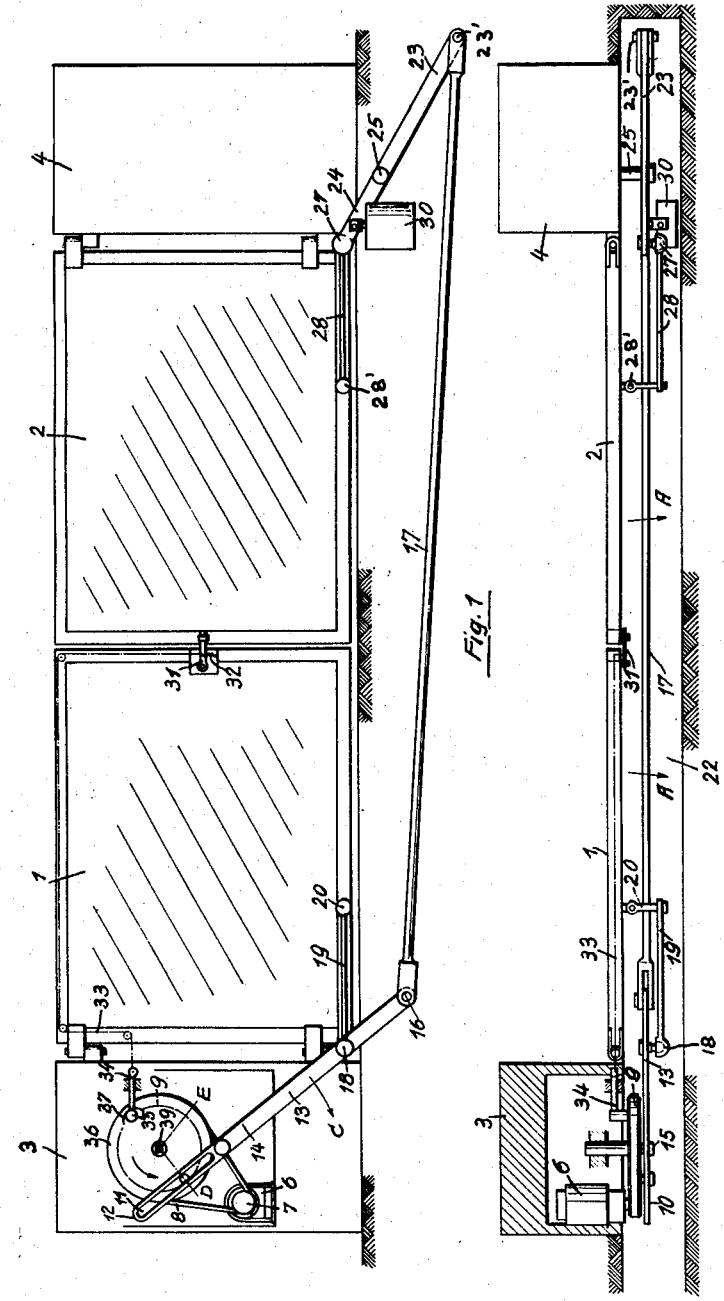

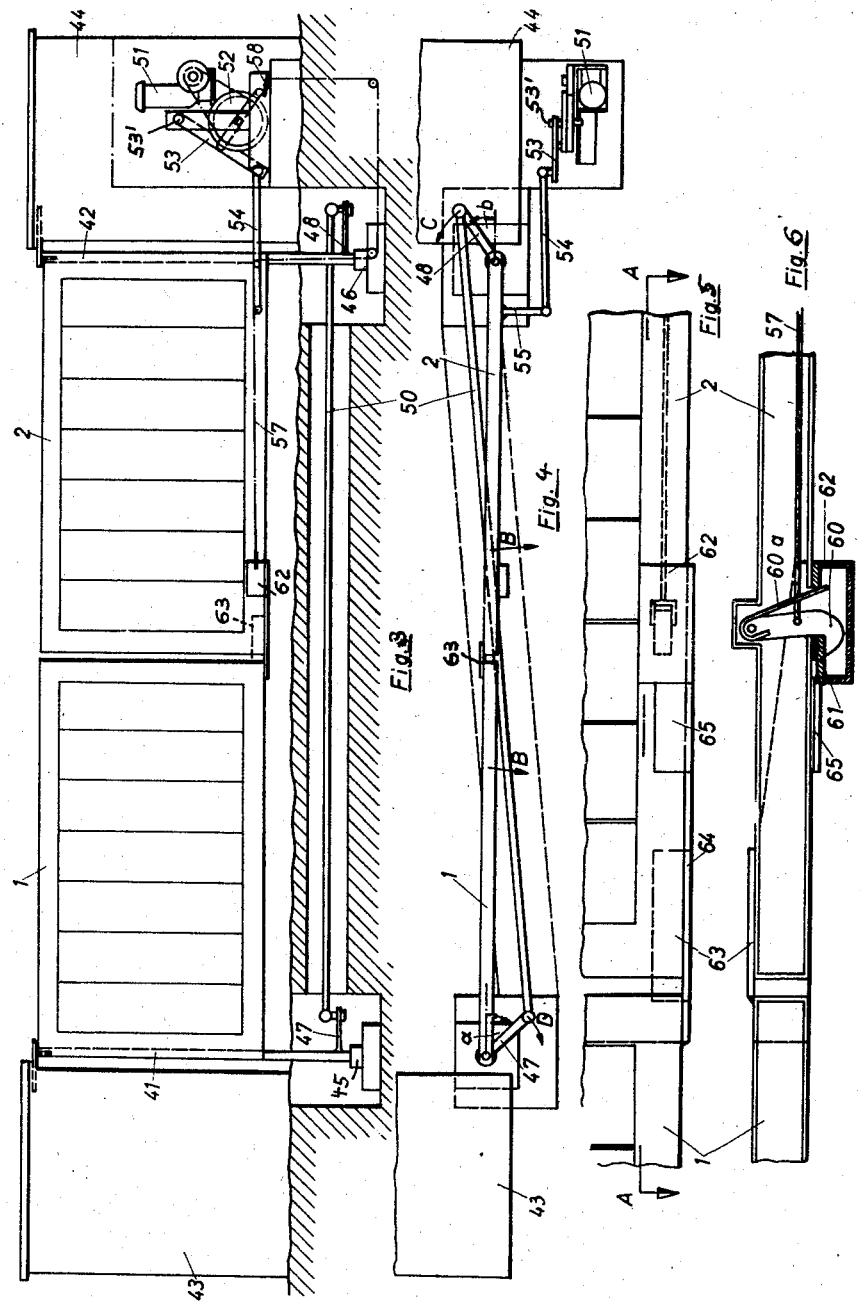

2,893,141

GATE DRIVE WITH SLIDER CRANK

Gebhard Hügle, Pfullendorf, Baden, Germany

Application October 22, 1957, Serial No. 691,674

Claims priority, application Germany October 23, 1956

8 Claims. (Cl. 39—7)

My invention relates to a crank mechanism for automatically opening and closing the wings of gates.

It is known to open and close gates by means of an electrically driven crank mechanism. Such devices have the advantage that the driving motor can run in the same direction during opening and closing operations and that, when reversing the wing motion, the effect of inertia forces and hence the stress otherwise imposed upon the driving mechanism are reduced.

In a known device of this type, a crank drive opens the wings during one half of the crank rotation in opposition to the pulling force of a spring, and releases the door during the other one-half rotation to then permit closing of the gate by the spring force. The two wing movements, when using a sufficiently strong drive motor, have approximately the same time characteristic, in accordance with a sinusoidal travel-time curve.

In another known gate drive, the wing movement is derived from the rotary motion of a swing arm having an arcuate slot slidably engaged by a slide block. The arm is provided with a spur gear segment which transfers the forward and return motion of the swing arm to the hinge shaft of the wing. The arcuate, slotted swing arm causes the wing to remain open for some interval of time; and an additional, auxiliary device prevents an immediately following complete closing of the wing.

The above-mentioned known constructions are practically limited to being used with gates or doors of light weight and narrow width, such as house doors, and, so used, do not cause particular difficulties as regards accommodation of their mechanical components because these can be mounted within a house, for instance beneath the floor. However, the known devices are much less suitable for winged or hinged gates of larger width, such as used at the entrance gates of courtyards, parks or industrial plants. Such applications call for structural and functional requirements not, or not satisfactorily, met by the known devices.

It is, therefore, an object of my invention to improve gate drives of the crank type so as to make them more favorably applicable for the purposes last mentioned, and to afford other advantages mentioned below, that cannot be achieved by the gate drives heretofore available.

To this end, and in accordance with a feature of my invention, I provide the gate drive with a crank mechanism in which a slotted swing lever transmits the crank motion to the gate wings or sections and has two leverage arms of unequal length whose plane of motion extends parallel to the plane of the gate when closed, the shorter lever arm being provided with the slot to coact with the driving crank pin, whereas the longer lever arm is connected to the gate wings by means of intermediate linkages.

As a result, particularly favorable kinematic conditions are secured particularly for door wings or sections of a large radius, and the leverage conditions are most favorable as regards the space requirements for a large swinging travel of the gate wings or sections.

In order to obtain rapid opening of the gate but slow closing, the invention takes advantage of the characteristics of motion inherent in slider crank drives by transmitting the shorter arcuate travel of the crank to the gate wings in the opening sense and transmitting the longer arcuate travel in the closing sense. Consequently, the opening width of the gate is rapidly increased during opening but decreases slowly during closing so that, while running the electric drive motor unidirectionally at uniform speed, the available free gate opening comprises the major portion of the entire cycle of wing movement.

According to another feature of my invention, I connect the latching device of the gate with the crank drive so as to actuate the latch in dependence upon the motion of one of the kinematic members of the drive. Preferably, the control of the latch is made dependent upon the rotary travel of the crank pin in the dead-center range occurring near the starting point of the drive where the swing arm motion reverses its direction. According to a more specific feature, a driving gear actuated by the electric motor and carrying the crank pin is provided with a concentric cam acting upon a cam-follower lever which is in connection with the latching device of the gate and which is released by the cam to permit a latch-biasing spring to shift the latch into closing position.

Most of the gates to be motorized have two wings or sections. The invention makes it possible to use for both gate wing panels, or sections, a single motor and a single slider crank mechanism whose motions are transmitted to one gate section directly through a linking lever and to the other section through a connecting rod and a second swing lever, the second swing lever being linked to the other wing by a linking member.

The above-mentioned and other advantages and features of my invention, these features being set forth with particularity in the claims annexed hereto, will be apparent from, and will be mentioned in, the following description relating to the two embodiments of gate drives according to the invention illustrated by way of example on the accompanying drawings, in which—

Fig. 1 shows a front view of a gate and gate drive.

Fig. 2 shows partly in section a top view of the same gate.

Fig. 3 is a part-sectional view of another gate and gate drive.

Fig. 4 is a top view of the gate shown in Fig. 3.

Fig. 5 shows a detail of Fig. 4 on a larger scale; and

Fig. 6 is a cross section taken along the line A—A shown in Fig. 5.

According to Figs. 1 and 2, the wings 1 and 2 of the gate are hinged to respective jamb pillars 3, 4 and open in the direction indicated by respective arrows A.

The driving device for the gate wings is mounted on or within the pillar structure 3. The drive comprises an electric motor 6 whose pulley 7 is connected with a driving gear 9 through a V-belt.

The gear 9 has a stationary bearing and carries a crank pin 10 engaging a slot 11 in the shorter arm 12 of a swing lever 14. Swing lever 14 is pivoted for oscillating motion about a stationary fulcrum pin 15.

Linked to the longer arm 13 of the swing lever 14 is a connecting rod 17 by means of a pivot pin 16. Located between pivot pin 16 and fulcrum pin 15 is a universal-type joint 18 which connects the swing lever 14 with a linking member 19 whose other end is joined with wing 1 by a pivot joint 20.

The connecting rod 17 extends through a channel 22 beneath the gate to the other jamb pillar 4 where it is linked at 23' to a double-armed lever 23, 24 movable about a stationary fulcrum 25. The shorter arm 24 of the lever is provided with a universal-type joint 27 which connects the arm with a linkage member 28 pivotally joined with the gate wing 2 at 28'. The joints 20 and 28' have two mutually perpendicular pivot axes and thus also form a universal-type connection.

A counterpoise 30 is suspended from lever arm 24 in the vicinity of joint 27 for compensating the weight of the connecting rod 17. In the illustrated, closed condition of the gate, the wings 1 and 2 are locked by means of a latch 31 which is kept in closed position by the force of a spring 32. The latch 31 is automatically actuated in dependence upon the rotary position of the driving gear 9 and hence of the crank pin 10. For this purpose, the latch 31 is connected by a cable 33 or other flexible pull member with an axially displaceable rod 34 on which a roller 35 is journalled. Roller 35 abuts against a cam 36 concentrically joined with the driving gear 9. The cam contour has a recess 37 so located that when the gate wings are closed as shown on the drawing, the spring 32 is released for action to then permit the latch 31 to engage a catch on wing 2.

The entire device is shown in an operating condition in which the crank pin 10 is in one of its dead-center positions and the wings of the gate are closed and latched. When the drive motor 6 is energized, preferably by remote control, the driving gear 9 rotates in the direction of the arrow B. As a result, the roller 35 of the latch-control device is first lifted by the cam 9 and opens the latch 31. This occurs within the range of the above-mentioned dead-center position, namely at point D, of the crank pin 10. For that reason, and also due to clearance in the linkages, the crank pin 10 can move a few angular degrees from its accurate dead-center position without having any appreciable effect upon the swing lever 14. After passing through this initial amount of travel, the crank pin 10 commences to turn the lever 14 in the direction of the arrow C, thus also displacing the lever 23, 24. As a result, both gate wings 1 and 2 are opened. The leverage conditions are such that the opening movement is terminated, upon passing through an angle of 90°, when the crank pin 10 reaches its other dead-center position E. Since this opening movement follows the kinematics of a slider crank mechanism and takes place within the smaller arcuate path D—E traversed by the crank pin, the opening motion of the gate wings occurs with a velocity inversely proportional to the length of the arc D—E. During the further travel of the crank pin from point E to point D, the pin passes through the larger arcuate path and acts upon the swing lever 14 with a larger leverage arm.

On this path, the swing lever 14 moves in opposition to the direction of the arrow C so that the gate wings close. For the reasons above mentioned, the closing movement is slower than the opening movement.

Limit switches are preferably provided for stopping the electric motor when the gate reaches fully open and fully closed positions respectively. These limit switches are preferably mounted near the driving gear 9 from which they are actuated by corresponding dog members that abut against the limit switches respectively. The shaft of the driving gear 9 is preferably provided with a squared portion 39 accessible from the outside so that the door can be opened and closed by a hand crank in the event of electric power failure.

Since during opening movement the connecting rod 17 moves downward and during closing movement moves upward, the counterpoise 30 is provided for compensating the weight of the connecting rod. The same purpose, however, can be served by using a pulling spring which may be joined with the lever arm 24 at the mounting point of the counterpoise 30.

When the wings of gates are subjected to considerable wind pressure or other forces, considerable stress may be imposed upon the latch or lock device of the gate. According to another feature of my invention, therefore, I relieve the latch device from such stresses by providing an extension piece at the lower or upper horizontal edge of the one gate wing that is driven through the above-mentioned connecting rod, the extension piece projecting into overlapping relation to the other gate wing. Mounted on the connecting piece on the outer side of the gate is a stop member, and another stop member is mounted on the same extension piece but on the inner side of the gate where the catch for the latch member is likewise attached to the extension piece. As a result, when the gate is closed, the above-mentioned two stop members secured to one of the gate wings straddle and thus constrainedly secure the other wing in the closing position, the latch and catch being mounted laterally beside the vertical gap between the two wings.

Such constrained arresting of the one gate wing by the other, in order not to impair the reliability of the gate-latching operation, makes it preferable to have one of the wings lead the other during opening and closing movements. For this purpose, according to another feature of my invention, I provide the wings near their respective hinge axes with horizontal arms which rotate in a horizontal plane for opening or closing the wing and which have respective different angular positions relative to the vertical plane defined by the two hinge axes. As a result, the one gate wing that is driven through the connecting rod leads the other wing during closing movement. Another result is a simplification in the construction of the motion-transferring means, because the connecting rod also moves within a horizontal plane so that the above-described weight compensation by a counterpoise can be eliminated.

It may be desirable to drive a vehicle through the open gate in a direction inclined toward the gate line without danger of damaging the open gate wings. For this purpose, the leverages of the effective lever arms between the slider crank and the gate wings are so chosen that the door wings, when fully open, are located away from the gate line an angle larger than 90°

The embodiment shown in Figs. 3 to 6 incorporates all above-mentioned modifying features.

According to Figs. 3 to 6, the hinge shafts 41 and 42 of the respective gate wings 1 and 2 are revolvably fastened to the jamb pillars 43 and 44 and are also journalled in supporting bearings 45 and 46 respectively. Closely above these bearings, the respective hinge shafts 41 and 42 are provided with lateral arms 47 and 48. The angle (a) formed between the arm 47 and the geometric line (gate line) between the hinges 41 and 42 is larger than the angle (b) formed by the lever 48 relative to the same connecting line. For example, the angle (a) may amount to 45° and the angle (b) to 35° as is apparent from Fig. 4. The ends of respective arms 47 and 48 are linked to the ends of a connecting rod 50 and are located, together with bearings 45, 46 and connecting rod 50, in a channel in the floor or ground beneath the gate structure.

The drive for operating the gate is substantially similar to the one described above with reference to Figs. 1 and 2. The drive comprises an electric motor 51 which drives a gear 52 provided with a concentric cam and actuating a slotted swing lever 53 by means of a crank pin engaging the slot of lever 53. Lever 53 is pivoted on a stationary fulcrum pin 53'. The oscillating motions of the swing lever 53 are transmitted to the gate wing 2 through a linking rod 54 and through an arm 55 rigidly joined with the wing structure. The leverage conditions of the crank mechanism are so chosen, in analogy to those mentioned above with reference to Figs. 1 and 2, that the opening movement in the direction of the arrow B corresponds to the shorter arcuate travel of the swing lever 53 whereas the closing movement takes place during the longer arcuate travel. The automatic unlatching of the gate lock is effected by means of a cable 57 attached to a control lever 58 which is actuated by the cam of gear 52. In principle, the performance of this device is the same as described with reference to Figs. 1 and 2.

The latching device is shown more in detail in Figs. 5 and 6. The latch 60 pivotally mounted in the gate wing 2 is biased to closing position by means of a leaf spring 60a and is engageable with a catch member 61 of gate 1. The latch components are protected by a housing 62.

It will be noted that the latching device is not located in the conventional manner at the vertical gap between the two wings, but is mounted laterally of the vertical gap at the lower edge of the wing 2. When the gate is high, the latching device may also be located near the upper edge of the door.

At the side of the latching device, the gate panel or section 1 carries a stop member 63 which extends upwardly from the bottom edge. The panel or section 2 abuts against the stop member 63 when the gate is in the illustrated, closed condition. Mounted on the bottom side of the gate section 1 is an extension piece 64 which passes beneath the gate section 2 and carries the protective housing 62 and the catch member 61 as well as the stop member 63 and another stop member 65.

For opening the gate, the motor 51 is energized, for instance by remote control, and then turns the drive gear and cam member 52 clockwise (Fig. 3). At first, the control lever 58, actuated by the cam, is effective to pull the rope 57 and thus the latch 60 in opposition to the force of spring 60a so as to withdraw the latch from the catch 61. Immediately thereafter, the levers 54 and 55 are effective to open the gate section 2 in the direction of the arrow B. The arm 48 connected with the hinge shaft 42 of gate section 2 turns in the direction of the arrow C. This motion is transmitted by connecting rod 50 to the arm 47 which thus is moved in the direction of the arrow D and thus turns the hinge shaft 41 of gate wing or panel 1 in the opening sense. Since the angle (b) at arm 48 is smaller than the angle (a) at arm 47, the swinging movement performed by the hinge shaft 42 of gate 2 is asymmetrically transmitted to the hinge shaft 41 of wing 1 so that, during opening of the gate, the gate section 2 will lead the gate section 1, whereas during closing, gate section 1 will lead gate section 2. As is apparent particularly from Fig. 6, the gate section 2, in closed condition of the gate, is straddled and constrainedly held in position by the stop members 63 and 65 of the extension piece 64. Thus, a strong connection between the two wings or sections is obtained. This protects the gate from the effect of wind and other forces tending to open the gate. Furthermore, the latching mechanism proper is relieved of such forces, and the appertaining latch housing is better protected from tampering or unauthorized actuation.

It will be apparent to those skilled in the art, upon a study of this disclosure, that my invention permits of various modifications with respect to details and hence may be embodied in gate-driving devices other than those particularly illustrated and described herein, without departing from the essential features of my invention and within the scope of the claims annexed hereto.

I claim:

1. In combination with a gate having a hinged panel supported by and swingingly connected with a vertical gate post, a driving device comprising a motor, a slider crank mechanism having a crank member driven by said motor and an oscillating swing member having a slot engaged by said crank member to perform an oscillating motion during each individual rotation of said crank member, said swing member having a stationary fulcrum and a plane of oscillation parallel to the plane of the gate when closed, said swing member forming two leverage arms of different respective lengths, said slot being located in the shorter one of said two arms, and linking means joining the longer arm with said panel.

2. In combination with a gate having a hinged panel supported by and swingingly connected with a vertical gate post, a driving device comprising a motor, a slider crank mechanism having a crank member driven by said motor and an oscillating swing member, said swing member having a stationary fulcrum and having a slot engaged by said crank member to perform during each individual rotation of said crank member, an oscillatory motion which has respective forward and return strokes occurring during arcuate crank-member travel portions of different respective lengths, said swing member having a plane of oscillation parallel to the plane of the gate when closed and forming two leverage arms of different respective lengths, said slot being located in the shorter one of said two arms, and linking means joining the larger arm with said panel in the sense required to open the gate during the shorter arcuate travel of said crank member and to close the gate during the longer arcuate crank travel.

3. In combination with a gate having two hinged panels, each supported by and swingingly connected with a vertical gate post, a driving device comprising a motor, a slider crank mechanism having a crank member driven by said motor and an oscillating swing member having a slot engaged by said crank member to perform an oscillating motion during each individual rotation of said crank member, said swing member having a stationary fulcrum and a plane of oscillation parallel to the plane of the gate when closed, said swing member forming two leverage arms of different respective lengths, said slot being located in the shorter one of said two arms, link means connecting the longer arm of said swing member with said panels to impart opening and closing motion thereto, a latch on one of said panels and a coactive catch on the other panel, and means connecting said latch with said crank mechanism so as to release said latch from said catch in response to crank motion near the dead-center position of said crank member when in gate-closing position.

4. In a gate-driving device according to claim 3, a cam joined with said crank member to rotate together therewith, a cam follower engaging said cam and displaceable thereby when said crank moves away from said dead-center position, a latch spring normally biasing said latch to latching position, and a pull member extending between said latch and said cam follower for releasing said latch in opposition to the spring bias when said crank member moves away from said dead-center position.

5. In combination with a gate having two hinged sections, each supported by and swingingly connected with a vertical gate post, a driving device comprising a motor, a slider crank mechanism having a crank member driven by said motor and an oscillating swing member having a slot engaged by said crank member to perform an oscillating motion during each individual rotation of said crank member, said swing member having a stationary fulcrum and a plane of oscillation parallel to the plane of the gate when closed, said swing member forming two leverage arms of different respective lengths, said slot being located in the shorter one of said two arms, a link joining the longer arm with a first one of said sections, a second swing lever located near the second section and having a stationary fulcrum and a plane of motion parallel to the plane of the gate when closed, a connecting rod linking said first swing lever with said second swing lever, and a link joining said second swing lever with said second section, whereby both sections are operated simultaneously from said motor.

6. A gate-driving device according to claim 5, comprising an extension piece mounted on said second section and extending therefrom into overlapping relation to said first section at a location adjacent to a horizontal edge of said first section, said extension piece forming on the outer side of the gate a stop engageable by said first section, said extension piece having on the inner side of the gate another stop whereby said two stops jointly straddle said first section when the gate is closed, said latch being mounted on said first section, said catch being mounted on said extension piece on the inner side of said gate, and a housing enclosing said catch and also mounted on said extension piece on the inner side of the gate.

7. In combination with a gate having two vertical hinge axes and respective sections rotatable about said respective axes, a driving device comprising a motor, a slider crank mechanism having a crank member driven by said motor and an oscillating swing member having a slot engaged by said crank member to preform an oscillating motion during each individual rotation of said crank member, said swing member having a stationary fulcrum and a plane of oscillation parallel to the plane of the gate when closed, said swing member forming two leverage arms of different respective lengths, said slot being located in the shorter one of said two arms, linking means joining the longer arm with one of said section, two arm members rigidly joined with said respective sections and extending horizontally in transverse relation to said respective hinge axes, a connecting rod interlinking said two arm members to operate both sections simultaneously, one of said arm members forming with the vertical plane of said hinge axes an angle larger than the corresponding angle of the other arm member, whereby one of said sections leads the other during operation of the driving device and both sections, when open, form an angle of more than 90° relative to said vertical hinge plane.

8. In combination with a gate having hinged sections, each supported by and swingingly connected with a vertical gate post, a driving device comprising a motor, a slider crank mechanism having a crank member driven by said motor and an oscillating swing member having a slot engaged by said crank member to perform an oscillating motion during each individual rotation of said crank member, said swing member having a stationary fulcrum and a plane of oscillation parallel to the plane of the gate when closed, said swing member forming two leverage arms of different respective lengths, said slot being located in the shorter one of said two arms, linking means joining the longer arm with said sections, and manual actuating means provided on said crank member to permit operating the gate in the event of failure of said motor.

References Cited in the file of this patent
UNITED STATES PATENTS

| | | |
|---|---|---|
| 953,259 | De Hoog | Mar. 29, 1910 |
| 2,062,738 | Bigler | Dec. 1, 1936 |
| 2,561,623 | Hall | July 24, 1951 |
| 2,798,316 | Dollahite | July 9, 1957 |